(12) United States Patent
Tseng

(10) Patent No.: US 8,524,079 B1
(45) Date of Patent: Sep. 3, 2013

(54) ASSEMBLING STRUCTURE FOR A FILTRATION SET

(71) Applicant: Chung-Yen Tseng, Taichung (TW)

(72) Inventor: Chung-Yen Tseng, Taichung (TW)

(73) Assignee: Rite2Water Co., Ltd, Taichung (TW)

( * ) Notice: Subject to any disclaimer, the term of this patent is extended or adjusted under 35 U.S.C. 154(b) by 0 days.

(21) Appl. No.: 13/656,755

(22) Filed: Oct. 22, 2012

(51) Int. Cl.
*B01D 27/08* (2006.01)
*B01D 35/30* (2006.01)

(52) U.S. Cl.
USPC .................................. 210/232; 210/323.2

(58) Field of Classification Search
USPC .............................. 210/232, 323.2
See application file for complete search history.

(56) References Cited

U.S. PATENT DOCUMENTS

| | | | | |
|---|---|---|---|---|
| 5,891,333 A * | 4/1999 | Ferguson | | 210/232 |
| 5,895,570 A * | 4/1999 | Liang | | 210/232 |
| 6,497,817 B1 * | 12/2002 | Liang | | 210/232 |
| 6,969,462 B2 * | 11/2005 | Liang | | 210/232 |
| 2004/0200763 A1 * | 10/2004 | Liang | | 210/90 |

* cited by examiner

*Primary Examiner* — Thomas M Lithgow

(57) ABSTRACT

An assembling structure for a filtration set includes a filter set having a plurality of filter cases, the filter cases assembled together, an assembling portion extruded on an outer surface of each filter case, the assembling portion extending from a top to a bottom of each filter case, at least one assembling plate having two ends which are respectively extruded from each side of the assembling portion and the outer surface of the corresponding filter case, the assembling plate having a positioning block at a periphery thereof, a plurality of bolts used to be inserted through the positioning block of each filter case. Wherein, a user can assemble the filter cases together via the positioning block and the bolt.

4 Claims, 7 Drawing Sheets

ASSEMBLING STRUCTURE FOR A FILTRATION SET

BACKGROUND OF THE INVENTION

1. Field of the Invention

The present invention relates to an assembling structure and more particularly to an assembling structure for a filtration set.

2. Description of Related Art

A conventional assembling structure for a filtration set comprises a main case, a frame and a filter set. The main case has a front opening. The filter set is assembled onto the frame. The frame with the filter set is received into the main case via the front opening. The filter set has a plurality of filter cases. The filter cases are connected in series connection via a plurality of connecting units. Each connecting unit is connected between each two adjacent filter cases. The filter cases connected in series connection are assembled onto the frame.

Under this arrangement, when a user wants to detach one filter case from the filter set, the user pulls the frame out from the main case; and than, the user detaches the two connecting units at two sides of the above one filter case; as a result, the above one filter case is detached from the filter set.

However, the conventional assembling structure for a filtration set still has two disadvantages as following:

First, the above assembling operation (or detaching operation) is complicated, because the user must assemble (or detach) the connecting units at first.

Second, when the user assembles (or detaches) the filter cases, the connecting units might be lost.

The present invention has arisen to mitigate and/or obviate the disadvantages of the conventional. Further benefits and advantages of the present invention will become apparent after a careful reading of the detailed description with appropriate reference to the accompanying drawings.

SUMMARY OF THE INVENTION

The main objective of the present invention is to provide an improved assembling structure.

To achieve the objective, an assembling structure for a filtration set comprises a filter set having a plurality of filter cases, the filter cases assembled together, an assembling portion extruded on an outer surface of each filter case, the assembling portion extending from a top to a bottom of each filter case, at least one assembling plate having two ends which are respectively extruded from each side of the assembling portion and the outer surface of the corresponding filter case, the assembling plate having a positioning block at a periphery thereof, a plurality of bolts used to be inserted through the positioning block of each filter case. Wherein, each assembling plate has an assembling groove defined at the periphery thereof, the assembling groove is adjacent to the corresponding positioning block; a shape of the assembling groove is corresponding to each positioning block; the positioning block of one filter case is partially received into the assembling groove of another filter case; one side of the positioning block is adjacent to the assembling plate and is formed as concave-shaped; a connecting plate is set onto the assembling plates of two pairs of assembled filter cases; wherein, the connecting plate has a plurality of through holes opened thereon, and each assembling plate of the above two pairs of assembled filter cases has one threaded hole which is corresponding to the corresponding through hole; finally, a plurality of screw units is provided and each screw unit passes through the corresponding through hole so as to be screwed into the corresponding threaded hole, so that the above two pairs of assembled filter cases are assembled to each other.

Under this arrangement, when a user wants to assemble the filter cases together, the user aligns one positioning block of one filter case and another corresponding positioning block of another corresponding filter case, so that one positioning block abuts against another positioning block; then, the user inserts the bolt through one positioning block and another corresponding positioning block so as to assemble one filter case to another corresponding filter case.

Further benefits and advantages of the present invention will become apparent after a careful reading of the detailed description with appropriate reference to the accompanying drawings.

DETAILED DESCRIPTION OF THE INVENTION

Figure 1:
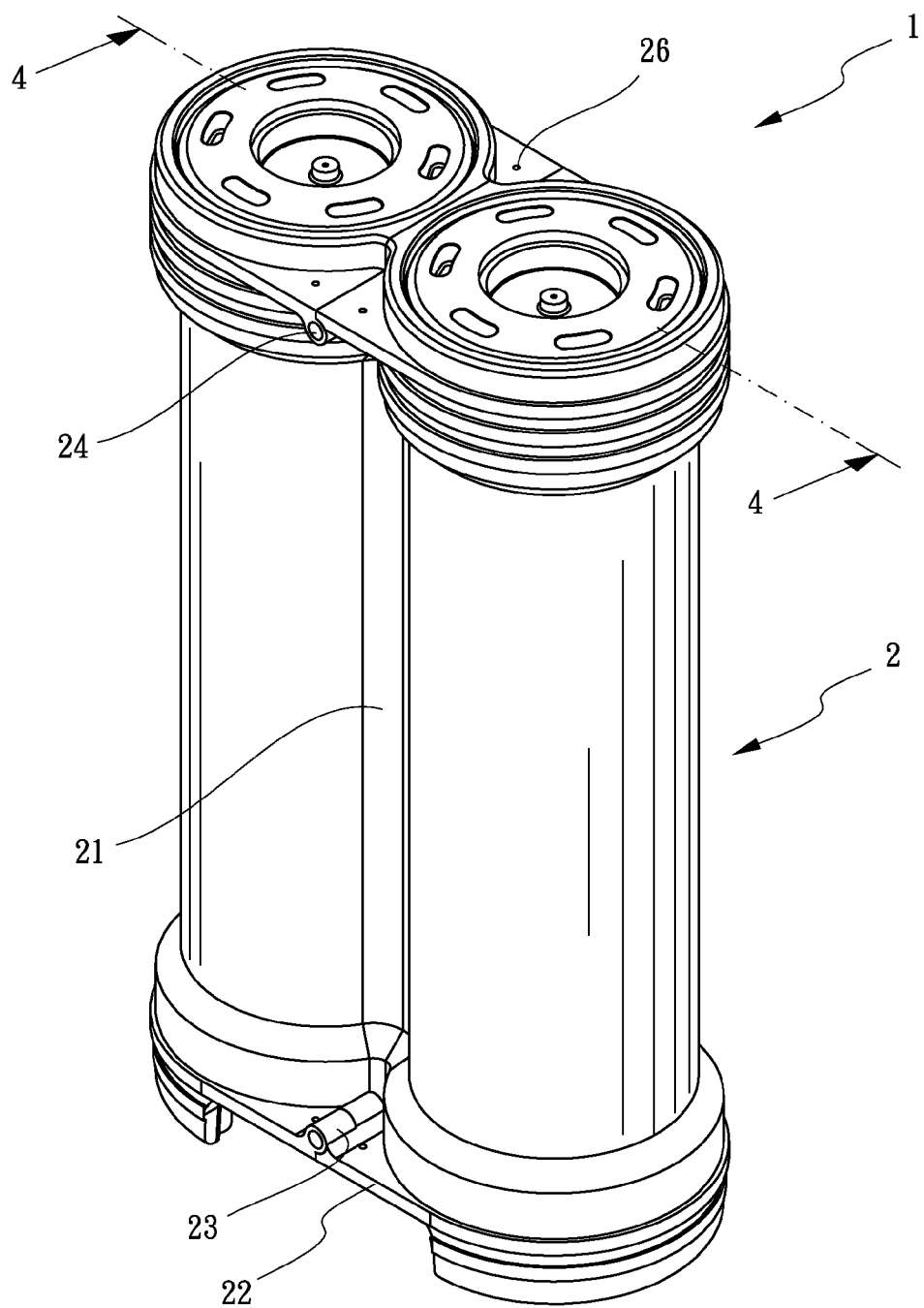
FIG. 1 is a perspective view of an assembling structure for a filtration set of the present invention, for showing a filter set with two filter cases.
Figure 2:
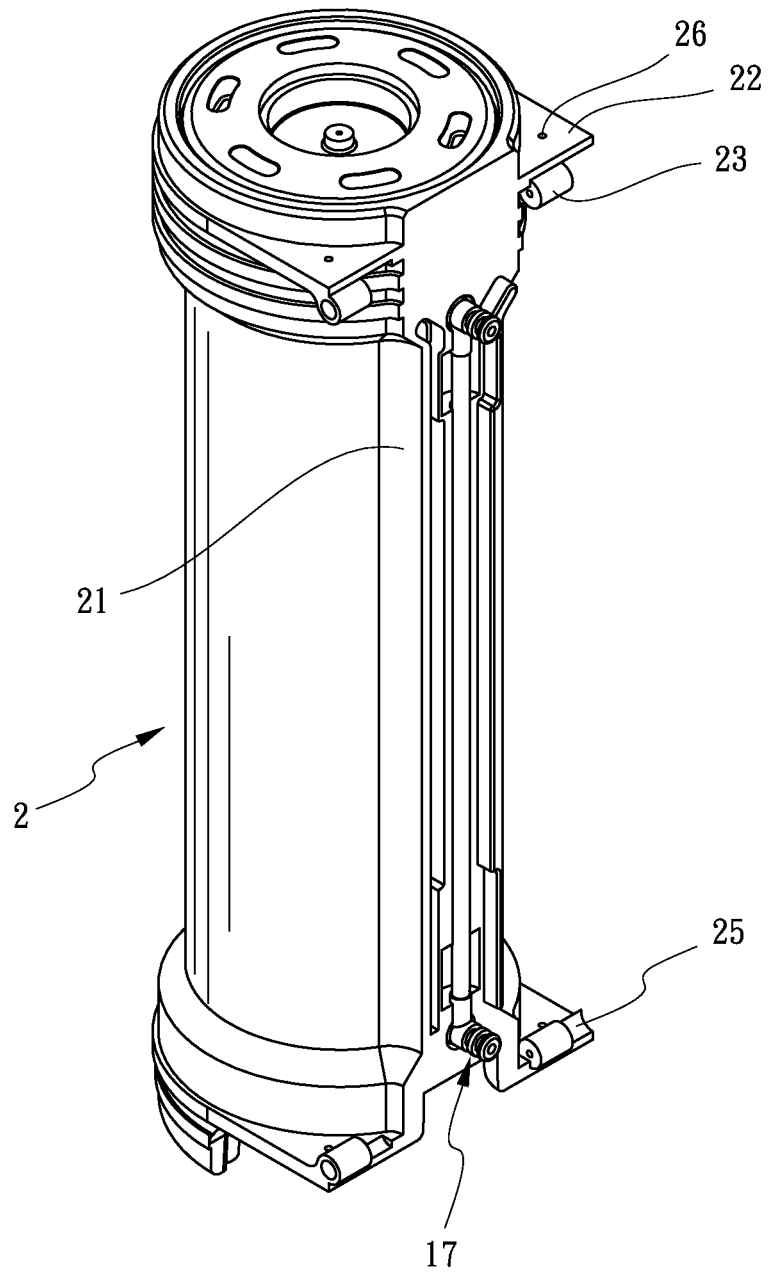
FIG. 2 is a perspective view of the assembling structure for a filtration set, for showing a filter set with single filter case.
Figure 3:
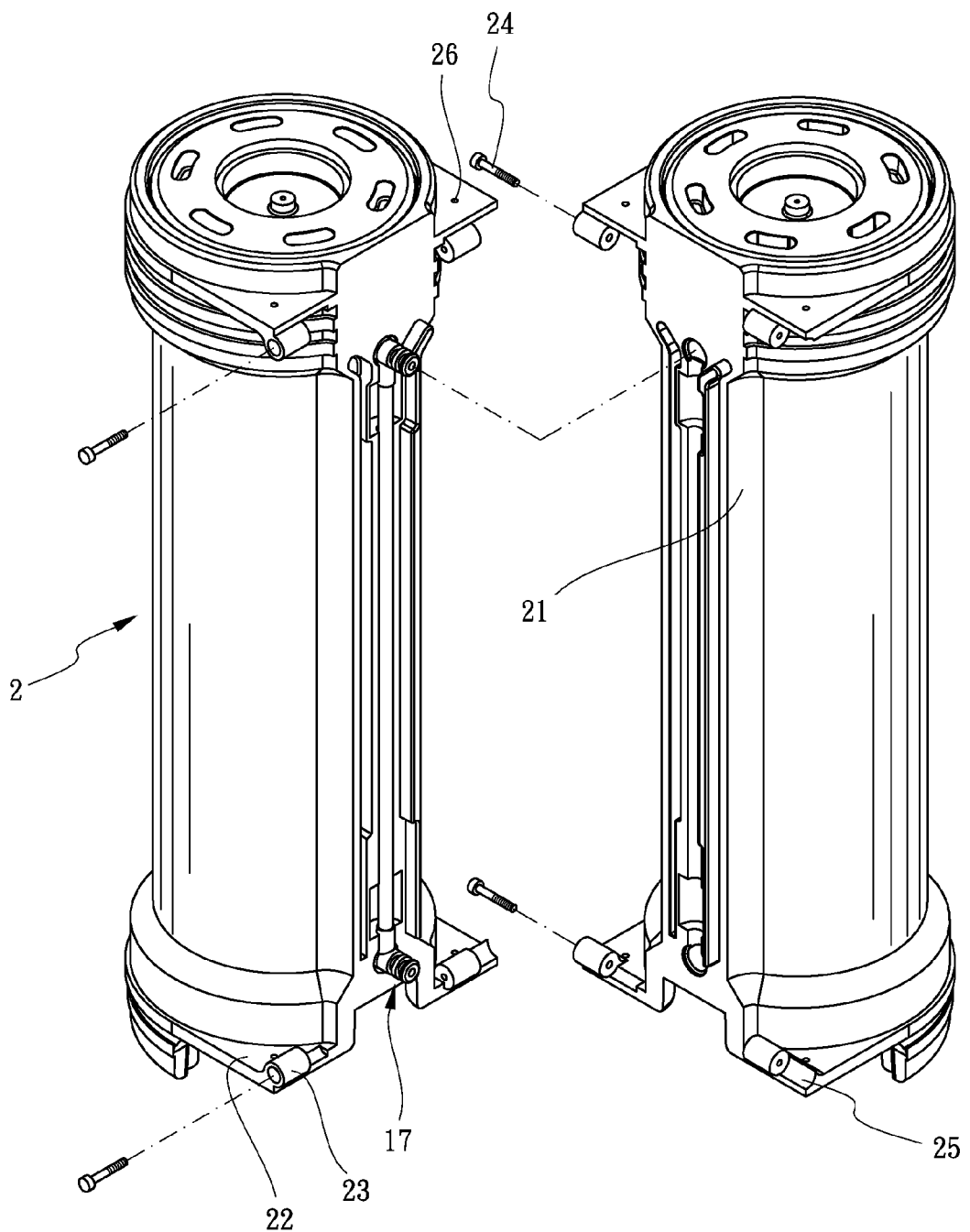
FIG. 3 is an exploded view for showing the filter set with two filter cases.

Referring to FIGS. 1-4, an assembling structure for a filtration set in accordance with the present invention comprises a filter set 1 having a plurality of filter cases 2. The filter cases 2 are assembled together. An assembling portion 21 is extruded on an outer surface of each filter case 2. The assembling portion 21 extends from a top to a bottom of each filter case 2. The assembling portion 21 of one filter case 2 is used to be connected to the assembling portion 21 of another corresponding filter case 2, so as to assemble each two adjacent filter cases 2 (as shown in FIG. 3). At least one assembling plate 22 has two ends which are respectively extruded from each side of the assembling portion 21 and the outer surface of the corresponding filter case 2. The assembling plate 22 has a positioning block 23 at a periphery thereof. A plurality of bolts 24 is used to be inserted through the positioning block 23 of each filter case 2.

Under this arrangement, when a user wants to assemble the filter cases 2 together, the user connects the assembling portion 21 of one filter case 2 to the assembling portion 21 of another corresponding filter case 2; then, the user aligns one positioning block 23 of one filter case and another corresponding positioning block 23 of another corresponding filter case 2, so that one positioning block 23 abuts against another positioning block 23; thereafter, the user inserts the bolt 24 through one positioning block 23 and another corresponding positioning block 23 so as to assemble one filter case 2 to another corresponding filter case 2.

Under this arrangement, when a user wants to assemble the filter cases 2 together, the user aligns one positioning block 23 of one filter case 2 and another corresponding positioning block 23 of another corresponding filter case 2, so that one positioning block 23 abuts against another positioning block 23; then, the user inserts the bolt 24 through one positioning block 23 and another corresponding positioning block 23 so as to assemble one filter case 2 to another corresponding filter case 2.

The detail of the above assembling is shown as FIGS. 1 and 3. One assembling portion 21 of one filter case 2 is attached to another assembling portion 21 of another filter case 2, so that each assembling plate 22 of one filter case 2 abuts against each corresponding assembling plate 22 of another filter case 2; each assembling plate 22 has an assembling groove 25 defined at the periphery thereof; the assembling groove 25 is adjacent to the corresponding positioning block 23; a shape of the assembling groove 25 is corresponding to each positioning block 23; the positioning block 23 of one filter case 2 is partially received into the assembling groove 25 of another filter case 2, so that each positioning block 23 of one filter case 2 is aligned with and abutted against each positioning block 23 of another filter case 2; each bolt 24 is inserted through each corresponding positioning block 23 of one filter case 2 and each corresponding positioning block 23 of another filter case 2 so as to assemble one filter case 2 to another filter case 2.

Figure 5:
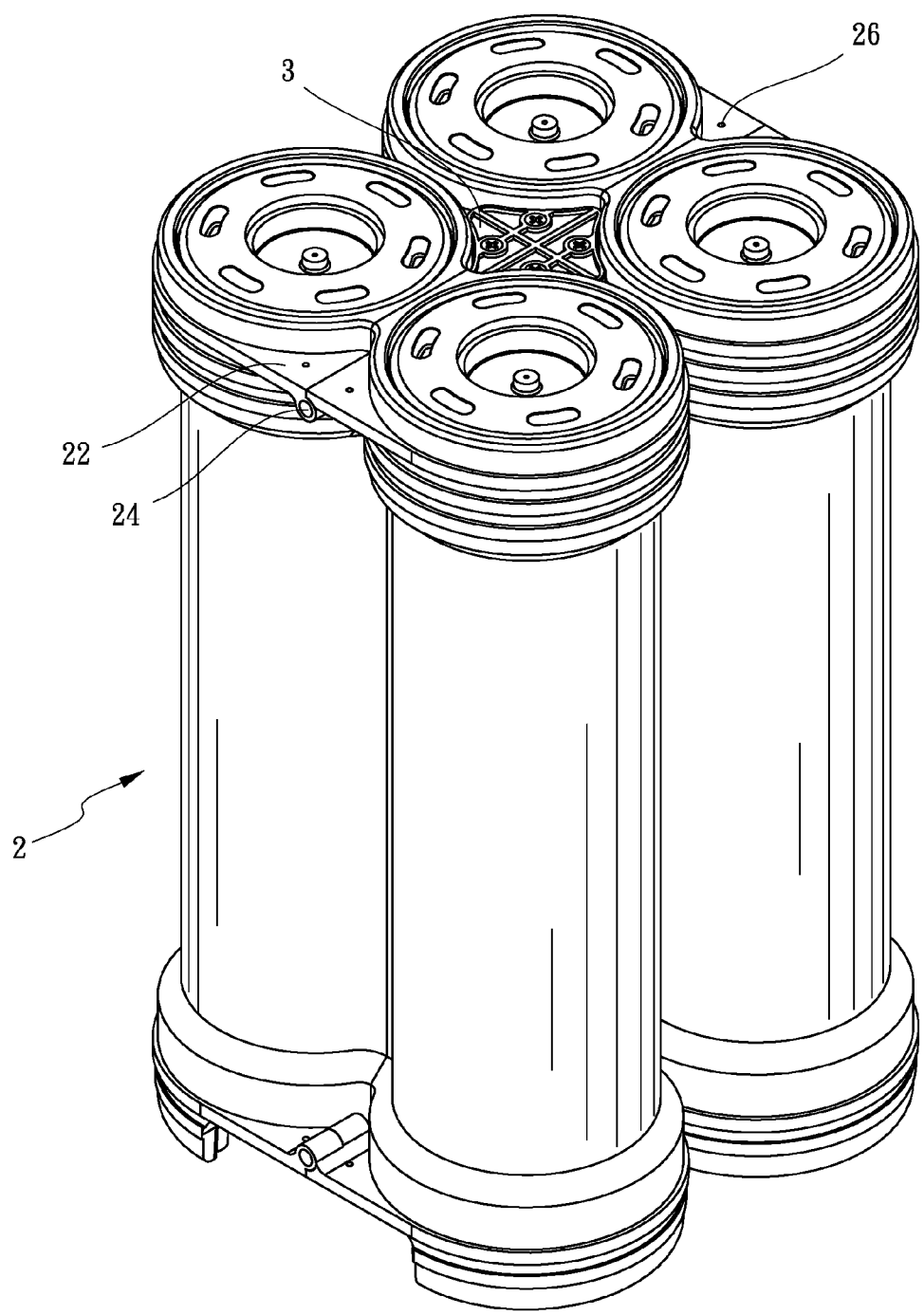
FIG. 5 is a perspective view of the assembling structure for a filtration set, for showing a filter set with four filter cases.
Figure 6:
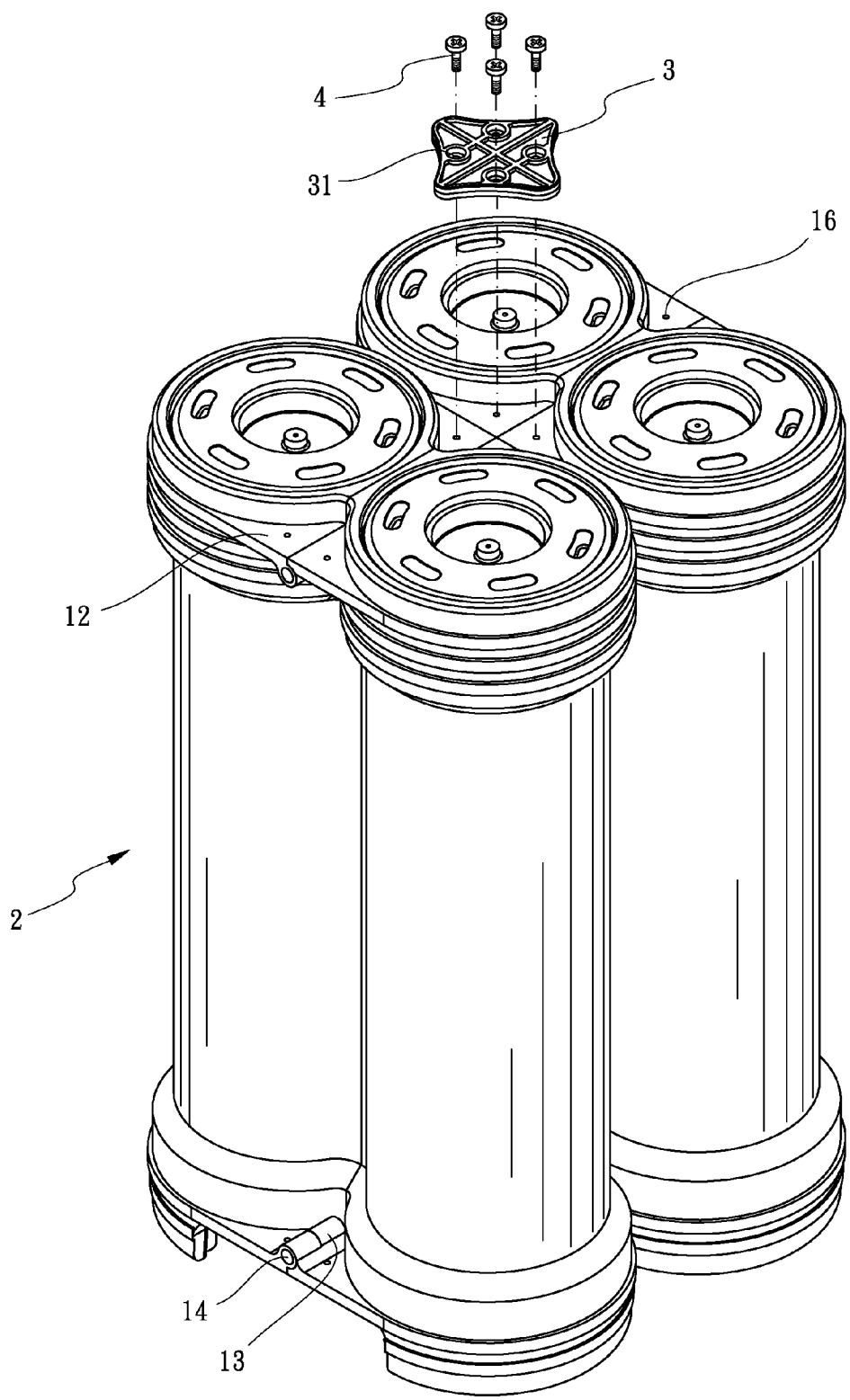
FIG. 6 is a partially exploded view for showing a connecting plate which is detached.

Referring to FIGS. 5-6, when the user wants to further assemble one pair of assembled filter cases 2 to another pair of assembled filter cases 2, the user aligns the above two pairs of assembled filter cases 2, and abuts one pair of assembled filter cases 2 against another pair of assembled filter cases 2, so that each assembling plate 22 of one pair of assembled filter cases 2 abuts against each corresponding assembling plate 22 of another pair of assembled filter cases 2; and then, a connecting plate 3 is set onto the assembling plates 22 of the above two pairs of assembled filter cases 2; wherein, the connecting plate 3 has a plurality of through holes 31 opened thereon, and each assembling plate 22 of the above two pairs of assembled filter cases 2 has one threaded hole 26 which is corresponding to the corresponding through hole 31; finally, a plurality of screw units 4 is provided and each screw unit 4 passes through the corresponding through hole 31 so as to be screwed into the corresponding threaded hole 26, so that the above two pairs of assembled filter cases 2 are assembled to each other (the amount of the assembled filter cases 2 is not limited by the present invention).

Figure 4:
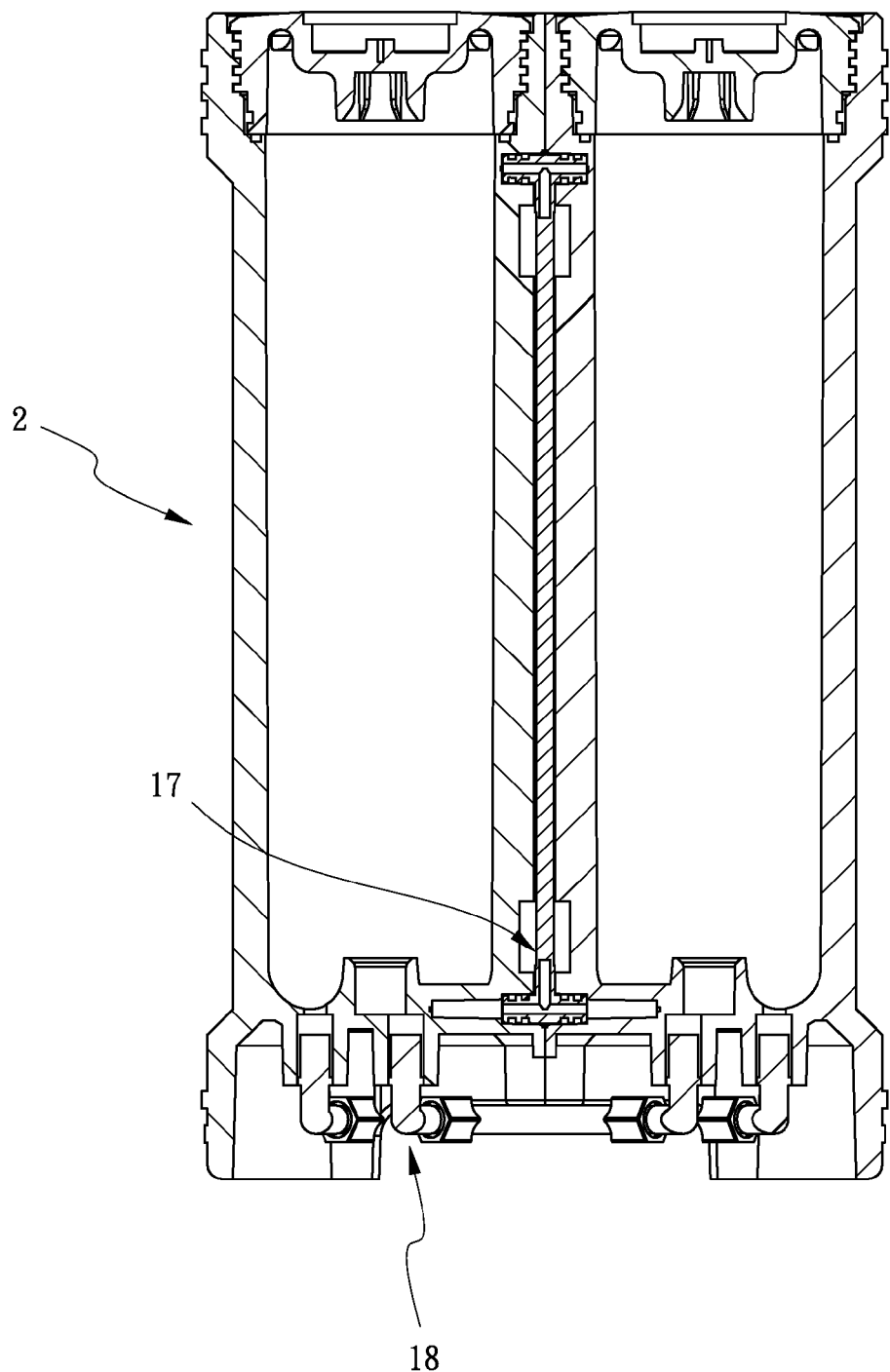
FIG. 4 is a cross-sectional view along a line 4-4 in FIG. 1 for showing a side guide pipe and a bottom guide pipe.
Figure 7:
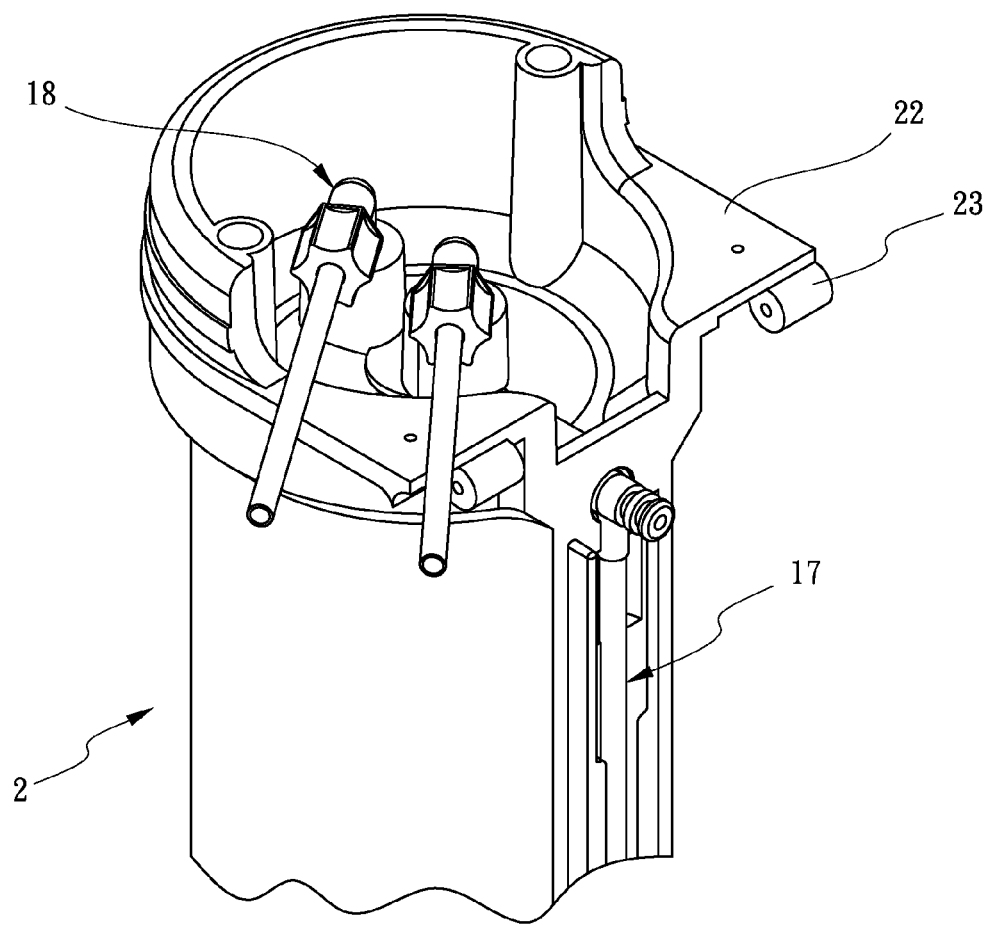
FIG. 7 is a perspective view for showing the bottom guide pipe of the filter case.

Furthermore, referring to FIGS. 2-3, 4 and 7, a side guide pipe 17 is assembled on the assembling portion 21 of one filter case 2; two ends of the side guide pipe 17 both communicate with an inside of one filter case 2; the two ends of the side guide pipe 17 of one filter case 2 is inserted into the assembling portion 21 of another filter case 2, so that the two ends of the side guide pipe 17 of one filter case 2 also communicate with an inside of another filter case 2. Therefore, a volume of water flows from one filter case 2 to another filter case 2 so as to be filtered via an inside filter (not shown). Referring to FIGS. 4 and 7, at least one bottom guide pipe 18 is assembled at a bottom of the filter case 2; the bottom guide pipe 18 communicates with the inside of the filter case 2; a further pipe is connected between the bottom guide pipe 18 of one filter case 2 and the bottom guide pipe 18 of another filter case 2. Therefore, the volume of water flows from one filter case 2 to another filter case 2 so as to be filtered via the inside filter (not shown). Referring to FIG. 2, one side of the positioning block 23 is adjacent to the assembling plate 22 and is formed as concave-shaped.

All in all, an assembling operation of the present invention is easy to operate because of the assembling portion 21, the assembling plate 22 and the positioning block 23 of the filter case 2.

Although the invention has been explained in relation to its preferred embodiment, it is to be understood that many other possible modifications and variations can be made without departing from the spirit and scope of the invention as hereinafter claimed.

What is claimed is:

1. An assembling structure for a filtration set comprising:
a filter set having a plurality of filter cases, the filter cases assembled together, an assembling portion extruded on an outer surface of each filter case, the assembling portion extending from a top to a bottom of each filter case, the assembling portion of one filter case used to be connected to the assembling portion of another corresponding filter case, at least one assembling plate having two ends which are respectively extruded from each side of the assembling portion and the outer surface of the corresponding filter case, the assembling plate having a positioning block at a periphery thereof, a plurality of bolts used to be inserted through the positioning block of each filter case;

wherein, when a user wants to assemble the filter cases together, the user connects the assembling portion of one filter case to the assembling portion of another corresponding filter case; then, the user aligns one positioning block of one filter case and another corresponding positioning block of another corresponding filter case, so that one positioning block abuts against another positioning block; thereafter, the user inserts the bolt through one positioning block and another corresponding positioning block so as to assemble one filter case to another corresponding filter case.

2. The assembling structure for a filtration set as claimed in claim 1, wherein each assembling plate has an assembling groove defined at the periphery thereof; the assembling groove is adjacent to the corresponding positioning block; a shape of the assembling groove is corresponding to each positioning block; the positioning block of one filter case is partially received into the assembling groove of another filter case.

3. The assembling structure for a filtration set as claimed in claim 1, wherein one side of the positioning block is adjacent to the assembling plate and is formed as concave-shaped.

4. The assembling structure for a filtration set as claimed in claim 1, wherein a connecting plate is set onto the assembling plates of two pairs of assembled filter cases; wherein, the connecting plate has a plurality of through holes opened thereon, and each assembling plate of the above two pairs of assembled filter cases has one threaded hole which is corresponding to the corresponding through hole; finally, a plurality of screw units is provided and each screw unit passes through the corresponding through hole so as to be screwed into the corresponding threaded hole, so that the above two pairs of assembled filter cases are assembled to each other.

* * * * *